US006327272B1

(12) United States Patent
Van Steenbrugge

(10) Patent No.: US 6,327,272 B1
(45) Date of Patent: Dec. 4, 2001

(54) DATA TRANSFER SYSTEM, TRANSMITTER AND RECEIVER

(75) Inventor: Bernard Van Steenbrugge, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/039,347

(22) Filed: Mar. 13, 1998

(30) Foreign Application Priority Data

Mar. 25, 1997 (EP) .................................................. 97200898

(51) Int. Cl.[7] ........................................................ H04J 3/00
(52) U.S. Cl. ........................ 370/498; 370/503; 370/465; 369/59.27
(58) Field of Search ..................................... 370/498, 503, 370/465; 369/32, 59.27, 59.26; 700/94; 710/61; 340/825.21, 825.57, 825.68; 375/365

(56) References Cited

U.S. PATENT DOCUMENTS

| 4,168,469 | * | 9/1979 | Parikh | 375/365 |
| 4,519,034 | * | 5/1985 | Smith | 710/61 |
| 4,755,817 | | 7/1988 | Vandenbulcke | 340/825.57 |
| 4,841,513 | * | 6/1989 | Farhangi | 369/59.26 |
| 5,223,832 | * | 6/1993 | Ishida | 340/825.68 |
| 5,289,439 | * | 2/1994 | Koulopoulos | 369/32 |

FOREIGN PATENT DOCUMENTS

| 0 194 720-A2 | * | 9/1986 | (EP) . | |
| WO9721310 | | 6/1997 | (WO) | H04N/7/52 |

* cited by examiner

*Primary Examiner*—Edwin C. Holloway, III
(74) *Attorney, Agent, or Firm*—Steven R. Biren

(57) ABSTRACT

A data transfer system transfers frames with more than two data words from a transmitter 100 to at least one receiver 102 in a time-multiplexed manner. The transmitter 100 and receiver(s) 102 are connected via four signal lines: a clock signal 112, a serial data signal 110, a word-select signal 114 and a frame-begin signal 116. The data is serially transferred via the serial data line 110, in synchronisation with periodic clock pulses of the clock signal 112. The word-select signal 114 triggers selecting a next transmit channel register from which the transmitter 100 transmits the next data word and a next receive channel register into which the receiver 102 stores the data word to be received next. The frame-begin signal 116 triggers selecting a first one of the channel registers. The data transfer system may, for instance, be used for transferring eight digital audio channels in a DVD player between components such as an input/output interface, a filter, a (de-)coder or a digital signal processor. The data transfer system is compatible with I²S.

23 Claims, 4 Drawing Sheets

DATA TRANSFER SYSTEM, TRANSMITTER AND RECEIVER

The invention relates to a data transfer system comprising a transmitter and at least one receiver; the transmitter and receiver being connected by a data line for time-multiplexed transfer of data words. The invention further relates to a transmitter for time-multiplexed transfer of data words via a data line. The invention also relates to a receiver for receiving time-multiplexed data words via a data line.

U.S. Pat. No. 4,755,817 describes a data transfer system, known as $I_2S$ (Inter-IC Sound), which is widely used for transferring digital audio data between digital audio components, such as digital input/output interface, including A/D and D/A converters and IEC 958 transceivers, digital filters, digital error correctors, dedicated digital coders/decoders and general purpose digital signal processors. The transmitter and receiver(s) are connected via three signal lines: a clock signal (SCK), a word-select signal (WS) and a serial data signal (SD) line. The data is serially transferred from the transmitter to the receiver(s) via the serial data line, in synchronisation with periodic clock pulses of the clock signal. The transmitter and the receiver(s) are synchronised to the same clock signal. $I^2S$ supports data transfer for two channels (the first and second channel, corresponding to the left and right audio channel respectively). The data of the channels is transferred in a time-multiplexed manner: transfer of a data word of the left channel is followed by transfer of a data word of the right channel and vice versa. The length of a data word is variable, up to 32 data bits. The two-level word-select signal controls the transfer of the data words. A change of the signal level indicates the start of the transfer of a new data word. The transmitter comprises for each data channel a corresponding channel register. A register selection means of the transmitter selects from which of the two channel registers a data word is transmitted. When the word-select signal becomes low ('0') the first channel register, corresponding to the left channel, is selected and when the word-select signal become high ('1') the second channel register, corresponding to the right channel, is selected. As such, the duration of the word-select signal in clock pulses indicates the length of the data word and the level of the signal indicates to which channel the data word corresponds. In a manner analogue to the transmitter, the receiver comprises two channel registers and a register selection means which operate for receiving data words.

For digital audio channels, the audio data is typically encoded using a linear-PCM coding, where a PCM word corresponds one-to-one to an $I^2S$ word. It is, however, allowed that the transmitter and receiver operate with a different word-size than used at system level and indicated by the word-select signal. Also the transmitter and receiver word lengths may be different. To guarantee compatible operation when different word-sizes are used, a data word is transmitted starting with the most significant bit (MSB). If the transmitter word is longer than the system word, only the most significant part of the transmitter word is transmitted with a number of bits corresponding to the length of the system word. If the transmitter word is shorter than the system word, the transmitter word is complemented for transmission with the required number of '0' bits at the least significant bit positions to form a word having the same length as the system word. Similarly, if the receiver word is shorter than the received word only the most significant bits of the received word that fit into the receiver word are processed. If the receiver word is longer, the received word is complemented during reception with the required number of '0' bits at the least significant bit positions to form a word having the same length as the receiver word. Instead of linear-PCM, other coding formats, such as MPEG-1 or MPEG-2, may be used as well in combination with a suitable manner of packaging the coded data in data words for transfer via $I^2S$. WO patent application PCT/IB96/01267 (PHN 15603) describes a burst format of the MPEG encoded audio for transfer via the IEC 958 transmission system, which uses a same frame sampling rate and contains the same number of data bits in a frame as $I^2S$. The data format described in the burst format may, advantageously, also be used for transfer of data via $I^2S$.

In a typical application, $I^2S$ is used in a CD player for transfer of the two-channel digital audio read from a CD to an audio decoder for producing an analogue output signal for the left and right audio channel. The digital audio is also transferred via $I^2S$ to an IEC 958 interface (also referred to as SPDIF) for transfer in a digital form to another device, such as a digital amplifier or recording device.

Increasingly, audio systems, such as surround sound systems, process more than a left and right audio channel. In fact, present-day MPEG2 technology has standardised five audio channels (plus one support channel): a Left, Right, Centre, Left Surround, Right Surround, and furthermore a low frequency enhancement (LFE) channel. Typically, the channels are read from a digital medium, such as a Digital Video Disc (DVD), in an encoded form and decoded, for instance by an MPEG decoder. DVD also supports a variable number of up to eight linear-PCM audio channels. The decoded MPEG audio channels or the linear PCM audio channels may be transferred to a local audio decoder for producing an analogue output signal for, for instance, the left and right audio channel. The audio channels may also be transferred in a digital form to a separate audio reproduction device, such as a surround amplifier, or a recording device. The transfer from the player device to the audio reproduction device or recording device may take place via the IEC 958 protocolled interface. For certain basic systems or certain applications (e.g. playing a CD), local transfer of two channels may be sufficient. For more advanced systems or applications (e.g. playing a DVD), local transfer of more than two channels is required.

$I^2S$ is designed for isochronous transfer of two-channel digital data and has no provisions for transferring data for more channels.

It is an object of the invention to provide a system, transmitter and receiver capable of transferring isochronous data for more than two channels. It is a further object that such a system, transmitter and receiver are based on $I^2S$, simplifying (re-)design of components and enabling to cost-effectively provide components which are compatible with $I^2S$.

To achieve this object, the data transfer system according to the invention comprises a transmitter and at least one receiver; the transmitter and receiver being connected by a data line for time-multiplexed transfer of data words of, in a first mode, up to a predetermined number N of data channels; N being larger than two and each data word comprising at least one data element. The transmitter comprises a sequence of N channel registers, each corresponding to a different one of the data channels; register selection means for selecting one of the channel registers for supply of a data word for transmission; the selection comprising selecting a first one of the channel registers in synchronisation with a frame-begin signal, and selecting a next one of the channel registers in synchronisation with a regular trigger provided by a word-select signal; the frame-begin signal having priority over the word-select signal; and means for, in synchronisation with a periodic clock signal, transmitting a data word from the selected channel register via the data line. The receiver comprises a sequence of N channel registers, each corresponding to a different one of the data channels; register selection means for selecting one of the channel registers for receipt of a data word; the selection comprising selecting a first one of the channel registers in synchronisation with the frame-begin signal, and selecting a next one of the channel registers in synchronisation with a regular trigger provided by the word-select signal; the frame-begin signal having priority over the word-select signal; and means for, in synchronisation with the periodic clock signal, receiving a data word via the data line and storing the data word in the selected channel register. The word-select signal indicates that a data word for a next channel needs to be transferred. In order to allow the components to identify for which channel data is being transferred (i.e. synchronise to the channels), a frame-begin (FB) signal is added identifying a first one of the channels. It is assumed that the channels are transferred in a predetermined sequence. In this way the $I^2S$ function of the word-select signal to indicate that the next data word corresponds to the left or right channel which only works for two channels, is replaced by two signals (the word-select signal and the frame-begin signal), allowing the transfer of more than two channels. The format and the timing of the word-select signal can be kept the same as used for $I^2S$. Advantageously N is a power of 2, allowing the use of a clock signal which differs with the same power of 2 from a system-wide clock signal which feeds the components involved in the processing of the isochronous data. All components can operate at the same frame rate, where the bit rate of the transfer system is higher than used by most other components. For instance a frame rate of 48 kHz. and a data word length of 16 data bits may be used, resulting in a bit-rate of 48,000*16=768,000 bps. per channel used by most components for processing a channel, whereas the transfer system may use a bit-rate of 48,000*16*8=6,144,000 bps. for transferring 16-bit words for eight channels. It should be noted that for $I^2S$ a frame consists of a left data word followed by a right data word and for the system according to the invention a frame consists of a sequence of N data words following the trigger of the frame-begin signal. Preferably, N=8 (referred to as Quad $I^2S$) is used providing sufficient capacity for transferring audio channels read from a DVD (MPEG2 channels or linear-PCM channels).

In a further embodiment according to the invention, the system in a second mode supports transfer of data words for up to a N2 data channels; N2 being smaller than N; wherein the frame-begin signal is a two-level signal and wherein the system comprises a frame controller operative to control the frame-begin signal by:

in the second mode maintaining the frame-begin signal at a first level; and in the first mode maintaining the frame-begin signal at the first level for the duration of the transfer of at least N2 but less than N successive data words and at a distinct second level for the remaining duration of the transfer of N successive data words; a transition of the frame-begin signal to the first level being the trigger causing the register selection means to select the first one of the channel registers. By keeping the frame-begin signal in the first mode at the same constant level for the first N2 words of a frame as used in the second mode, the first mode can be fully compatible for the part which is in common with the second mode. The frame-begin signal has no meaning in the second mode. Therefore, the first level is preferably chosen to be a default logic level, making it easy to provide for a device which can only operate in the second mode the default level required for devices which support both modes. In the second mode no provisions are available for distinguishing between more than N2 channels. To be able to distinguish between N frames (N being larger than N2), in the first mode the frame-begin signal is changed to the second level after N2 data words have been transmitted and before all N words of the frame have been transmitted and is changed to the first level at the start of the transfer of the first data word of the frame. Preferably, the frame-begin signal is changed to the second level in synchronisation with the end of the transmission of the N2-th data word. This allows components, such as the transmitter or receiver, to determine the mode of the system from the frame-begin signal. For the first N2 data words of a frame, the processing in the first and second mode is compatible. If at the end of the N2-th data word the frame-begin signal does not change, the system is in the second mode; otherwise the system is in the first mode. Preferably, for N2=2 the system in the second mode is compatible with $I^2S$.

In a further embodiment according to the invention, N2=2; the word-select signal is a two-level signal with a level transition of the word-select signal being the trigger for the register selection means to select a next one of the channel registers, and the register selection means is operative to, in the second mode, select, the first one of the channel registers in response to a transition of the word-select signal to a first level. In a manner compatible with $I^2S$, in the second mode of the system the level of the word-select signal indicates for which of the two channels a word needs to be transferred.

In a further embodiment according to the invention, the system is characterised in that the frame controller comprises an input for receiving an indication of the mode and wherein the frame controller is operative to control the frame-begin signal accordingly. As an alternative to monitoring the moment when the frame-begin signal changes to the second level, the mode may be set via a separate input. A microcontroller, advantageously, sets the mode in combination with setting other parameters for processing of the data.

In a further embodiment according to the invention, the system is characterised in that the frame controller comprises an input for receiving an indication of an actual number of data channels for which data elements need to be transferred and wherein the frame controller is operative to control the frame-begin signal for the second mode if the actual number corresponds to N2 and, otherwise, to control the frame-begin signal for the first mode. Particularly when the system is used for transferring data for a variable number of channels, it is advantageous that not only the mode is determined but also the actual number of channels transferred in the mode. As an example, for a system with N=8 and N2=2 used for transferring linear-PCM audio channels from a digital video disk, the second mode is chosen if two channels need to be transferred and the first mode if another number of channels need to be transferred. If in the first mode less than eight channels are transferred, the transmitter and receiver(s) may stop further processing of the unused channels.

A further embodiment of the system according to the invention is characterised in that the system comprises a word controller; the word controller comprising an input for receiving the clock signal and an output for supplying the word select signal; the word-select signal being a two-level signal and the word controller being operative to cause a level transition of the word-select signal in response to having received a predetermined number of clock pulses since a last preceding level transition; the predetermined number corresponding to the number of data elements in a data word. In this way the word-select signal is controlled in a manner compatible with I²S.

A further embodiment of the system according to the invention is characterised in that the word controller comprises an input for receiving an indication of the predetermined number of clock pulses and the word controller is operative to control the word select signal accordingly. In this way the word controller is informed of the word length and can control the word-select signal accordingly, allowing a system with a variable word length.

A further embodiment of the system according to the invention is characterised in that the transmitter comprises means for, if the actual number of data channels for which data elements need to be transferred is less than the predetermined number, generating dummy data elements for transmission for the data channels for which no data elements are available. In this way a simple and cost-effective isochronous transfer system with a high capacity is achieved which is capable of transferring data for a variable number of channels (up to the maximum capacity).

A further embodiment of the system according to the invention is characterised in that the system in the second mode is compatible with the I²S system.

A further embodiment of the system according to the invention is characterised in that N=8 and in the first mode the periodic clock signal has a frequency four times higher than for the I²S transfer system.

To achieve the object of the invention, the transmitter for time-multiplexed transfer of data words of, in a first mode, up to a predetermined number N of data channels via a data line, where N is larger than two and each data word comprises at least one data element, comprises:

a sequence of N channel registers, each corresponding to a different one of the data channels;

register selection means for selecting one of the channel registers for supply of a data word for transmission; the selection comprising selecting a first one of the channel registers in synchronisation with a frame-begin signal, and selecting a next one of the channel registers in synchronisation with a regular trigger provided by a word-select signal; the frame-begin signal having priority over the word-select signal; and means for, in synchronisation with a periodic clock signal, transmitting a data word from the selected channel register via the data line.

In a further embodiment according to the invention, the transmitter in a second mode supports transfer of data words for N2=2 data channels; the word-select signal being a two-level signal with a level transition of the word-select signal being the trigger for the register selection means to select a next one of the channel registers; the frame-begin signal being a two-level signal; and the register selection means being operative to: in the first mode select the first one of the channel registers, in response to a transition of the frame-begin signal to a first level; and in the second mode select the first one of the channel registers, in response to a transition of the word-select signal to a first level. In this way, the transmitter can in a slave role (i.e. being controlled by the word-select signal and/or the frame-begin signal and not generating the signals) in the second mode operate compatibly with an existing system, like I²S, and in the first mode support a more powerful transfer system by responding to the complementary frame-begin signal.

To achieve the object of the invention, the receiver for receiving time-multiplexed data words of, in a first mode, up to a predetermined number N of data channels via a data line, where N is larger than two and each data word comprises at least one data element, comprises:

a sequence of N channel registers, each corresponding to a different one of the data channels;

register selection means for selecting one of the channel registers for receipt of a data word; the selection comprising selecting a first one of the channel registers in synchronisation with the frame-begin signal, and selecting a next one of the channel registers in synchronisation with a regular trigger provided by the word-select signal; the frame-begin signal having priority over the word-select signal; and means for, in synchronisation with the periodic clock signal, receiving a data word via the data line and storing the data word in the selected channel register.

In a further embodiment according to the invention, the receiver in a second mode supports transfer of data words for N2=2 data channels; the word-select signal being a two-level signal with a level transition of the word-select signal being the trigger for the register selection means to select a next one of the channel registers; the frame-begin signal being a two-level signal; and the register selection means being operative to: in the first mode select the first one of the channel registers, in response to a transition of the frame-begin signal to a first level; and in the second mode select the first one of the channel registers, in response to a transition of the word-select signal to a first level. In this way, also the receiver can in a slave role in the second mode operate compatibly with an existing system, like I²S, and in the first mode support a more powerful transfer system by responding to the complementary frame-begin signal.

These and other aspects of the invention will be apparent from and elucidated with reference to the embodiments shown in the drawings.

The invention will now be described as used in a digital audio system. It will be appreciated that the invention can be applied more broadly for serially transferring data between components in an apparatus. The invention is particularly suited for transfer of isochronous data, such as audio or video, and for applications wherein multiple data channels need to be transferred in synchronisation.

Figure 1A:
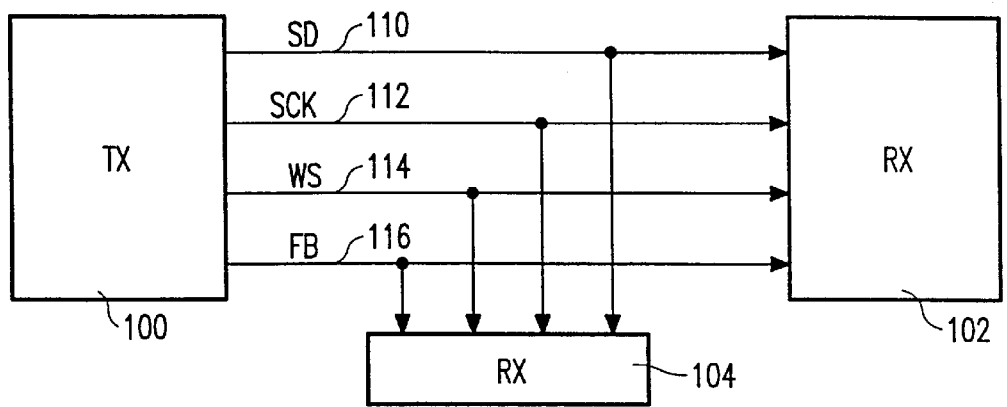
FIG. 1 illustrates a number of possible system configurations.
Figure 1B:
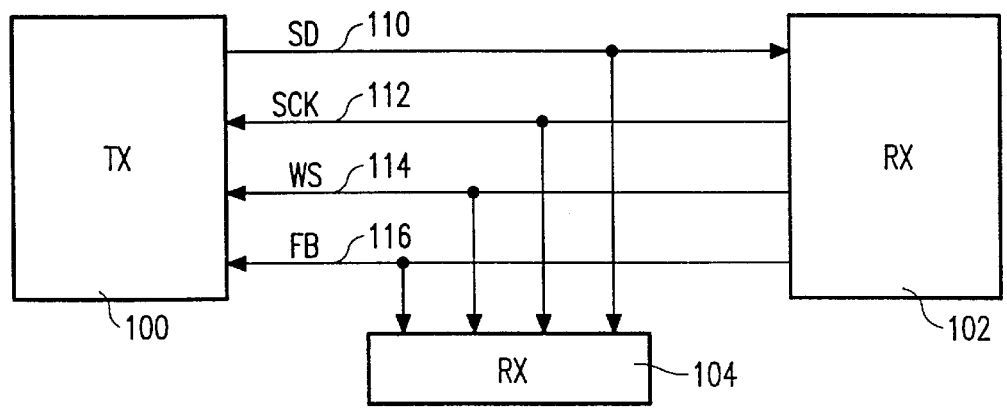
Figure 1C:
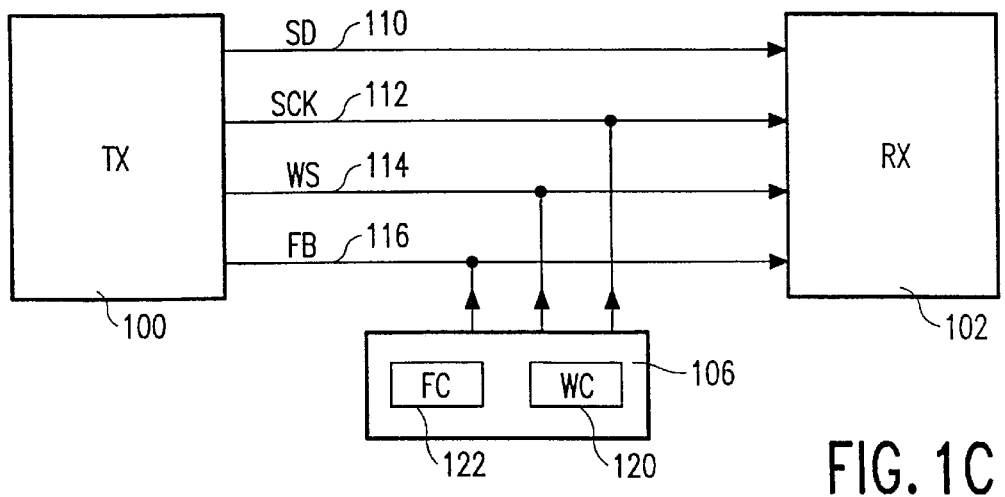

FIG. 1 illustrates a number of possible configurations in which the system can be used. A transmitter 100 is connected to one or more receivers (as an example two receivers 102, 104 are shown) via four signal lines: a data signal (SD) line 110, a clock signal (SCK) line 112, a word-select signal (WS) line 114, and a frame-begin signal (FB) line 116. The data signal 110 is always generated by the transmitter. Generating the other signals may be a function of the transmitter 100, one of the receivers 102 or 104, or of a special control unit 106. Typically, the three control signals are controlled by the same component. If this control function is integrated with the transmitter, the transmitter is seen to be acting in a master role with respect to those signals; otherwise the transmitter acts as a slave. Similarly a receiver can be acting as a master or a slave. It will be appreciated that for a given signal at any moment in time only one master is controlling the signal. In FIG. 1A the transmitter 100 acts as a master for all three controlling signals; the receivers 102 and 104 act as a slave. In FIG. 1B the receiver 102 acts as a master and the transmitter 100 and the receiver 104 as a slave. In FIG. 1C a separate control unit 106 acts as a master, whereas the transmitter 100 and the receiver 102 act as a slave.

Figure 2:
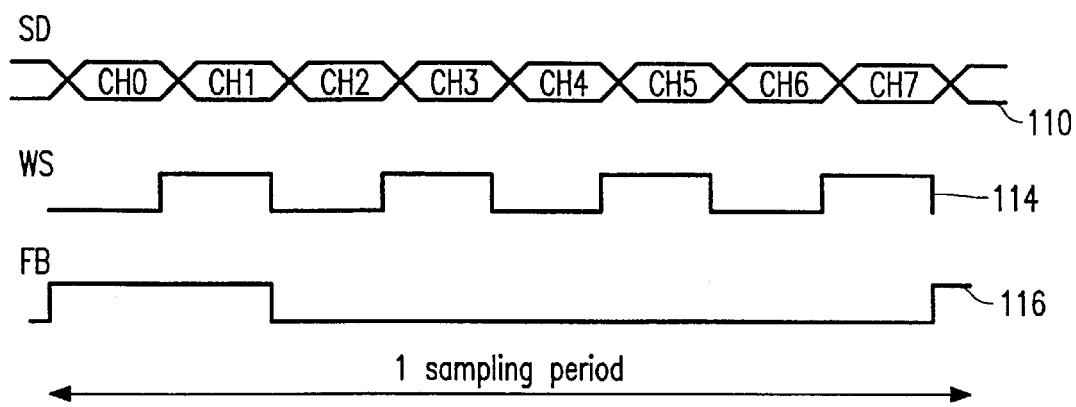
FIG. 2 shows a frame format according to the invention.

FIG. 2 illustrates the frame format of the system according to the invention operating in the first mode. One frame sampling period is shown during which data words are transferred for N channels. In the example, N=8 and the data words of the channels are numbered $ch_0$ to $ch_7$ to show the correspondence between the data words and the channels. The data words are transferred in a time-multiplexed manner via the data line 110, starting with the data word $ch_0$ for a first one of the N channels and stopping with the data word for the last channel (in the example, $ch_7$ for the N-th channel, where N=8). It is assumed that the sequence in which data words of the channels are transferred is known to the involved transmitter and receiver(s). A group of N successive data words $ch_0$ to $ch_{N-1}$ form a frame corresponding to one frame sampling period. The same frame format is used for successive sampling periods. The size of the data words may be chosen to best match the requirements of the apparatus in which the system is used. In $I^2S$ the word size may vary between 1 and 32 data bits. For a general purpose component, such as a DSP, which is intended to support the full word-size of $I^2S$ as well as being able to operate in the first mode according to the invention, it is preferred to internally support at least a word size of 32 data bits, in order to enable using the same registers for storing data words in $I^2S$ mode as well as in the first mode. It will be appreciated that, particularly, for more dedicated components, such as a D/A converter for use in a CD player, the internally supported word-size may be chosen optimally for a specific application (e.g. 16 bit for a CD player) while externally other word-sizes may be supported in a compatible way as has been described before for $I^2S$.

Figure 4:
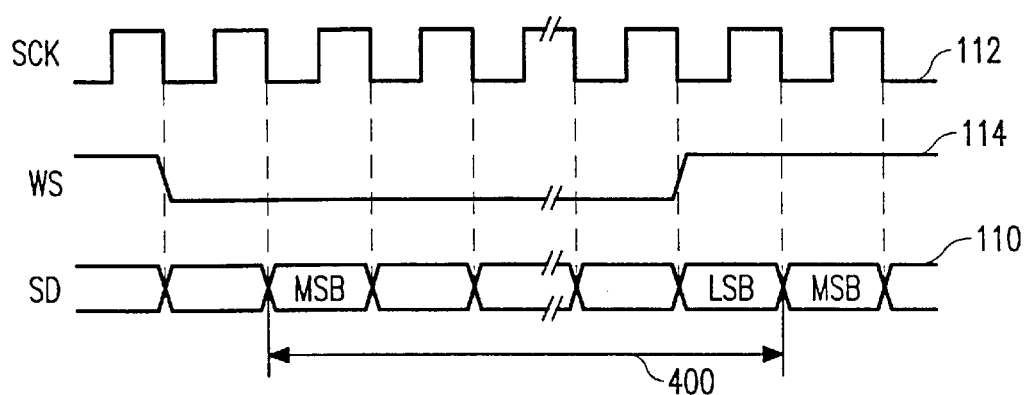
FIG. 4 shows an exemplary synchronisation of the frame.

The word-select signal 114 provides a regular trigger indicating that a data word for a next channel should be transferred. Typically, the trigger provided by the word-select signal is synchronised to the clock signal 112. Exact details of the synchronisation, such as being synchronised to the trailing or leading edge of the clock signal 112 are not relevant for the invention. Preferably, the trigger of the word-select signal is given a defined period, such as one clock period, before the transfer of the first data bit of the next word starts. This allows a slave transmitter to derive synchronous timing of the serial data that will be set up for transmission. It also enables a slave receiver to store the previously received word and clear the input for the next word. FIG. 4 illustrates the use of a timing for a data word 400 wherein the word-select signal 114 changes one clock period before the transfer of the first data bit of the next word.

Figure 3:
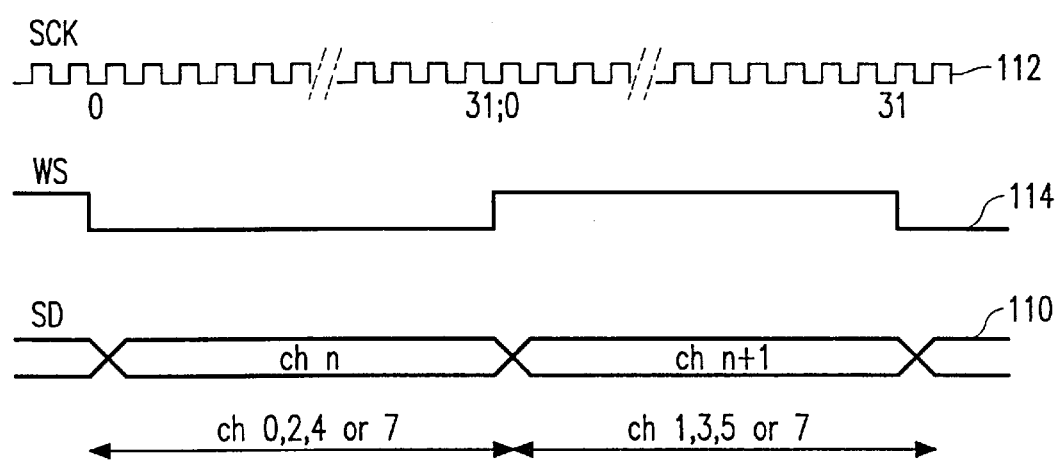
FIG. 3 illustrates an exemplary bit timing of the frame.

It will be appreciated that the word-select signal may take various forms, for instance with respect to the duration of a level of the signal and the number of distinct levels used. As an example, the word-select signal may be a two-level signal which is kept at a default level and where the trigger is provided by a short pulse at the other level with a duration of one clock period. Preferably, the word-select signal is a two-level signal where the trigger is provided by each level transition of the word-select signal and the duration for which the word-select signal stays at a level corresponds substantially to the length of the word. In this way, like for $I^2S$, the word-select signal indicates the word length, allowing for the transfer of data words with variable length. To enable full compatible operation with $I^2S$ for the first two words of a frame, if the system operates in the first mode the word-select signal should be kept low ('0') to indicate the first data word of a frame and high ('1') to indicate the second data word of the frame. It will be appreciated that in the first mode the word-select signal toggles to indicate successive data words beyond the first two data words, but that, using a two-level signal, the data words cannot be fully identified. This preferred form of the word-select signal is illustrated in FIG. 2 and, in more detail, in FIG. 3 for a 32-bit data word. In a more general form, compatibility with a system supporting transfer of data words for N2 channels, where the word-select signal identifies the word to be transferred can be achieved by using the same word-select signal for the first N2 data words of the frame for the system according to the invention operating in the first mode. For the remaining N−N2 data words of the frame the word-select signal may be repeated one or more times. If N2 is not a divisor of N, the last repetition may need to be truncated.

Preferably, a data word is transferred starting with the Most Significant Bit (MSB), as shown in FIG. 4, allowing compatible operation for, for instance audio applications, where the length of the transferred word may differ from the word-size used internally in the transmitter and/or receiver, as has been described for $I^2S$.

The frame-begin signal 116 provides a regular trigger indicating that a data word for the first channel of the frame should be transferred. In FIG. 2, the data word $ch_0$ is the first word of the frame. It will be appreciated that at the beginning of a frame a trigger is provided by both the word-select signal (indicating the start of a new word) as well as the frame-begin signal (indicating the start of a frame). The frame-begin signal has priority over the word-select signal: a data word of the first channel must be transferred and not of the next channel. With respect to the synchronisation of the frame-begin signal to the clock signal, similar consideration apply as described above for the word-select 114. Although in practical implementations it is preferred to use the same synchronisation for the word-select signal and the frame-begin signal, it is not required for the invention. Particularly if different synchronisation is chosen (e.g. the trigger provided by the frame-begin signal is a clock period earlier than the trigger of the word-select signal), care must be taken in ensuring that the frame-begin signal has priority. It will be appreciated that, like for the word-select signal 114, the frame-begin signal 116 may take various forms, for instance with respect to the duration of a level of the signal and the number of distinct levels used. As an example, the frame-begin signal may be a two-level signal which is kept at a default level and where the trigger is provided by a short pulse at the other level with, for instance, a duration of one clock period. Preferably, the frame-begin signal is a two-level signal where the trigger is provided by a defined level transition of the frame-begin signal. In the second mode, the frame-begin signal is not used. It is preferred to keep the frame-begin signal constant at a first one of the two levels while operating in the second mode. In order to operate as much as possible similar in both modes, it is preferred to keep the frame-begin signal at the same first level during the first N2 data words of a frame when the system is operating in the first mode. Advantageously, this enables the transfer at system level of data words and frames with a variable word length. During the remaining N–N2 data words the frame-begin signal is changed to the second level, allowing the change to the first level to occur at the beginning of the next frame and, therefore, to indicate the beginning of the transfer of the first data word in the next frame. Preferably, the frame-begin signal is changed from the first level to the second level in synchronisation with the beginning of the N2+1-th data word of the frame. In this way, the involved components are informed of the fact that processing should be according to the first mode at the first instance when the components should differentiate between the two modes (processing for the first N2 frames can be the same in both modes). FIG.2 illustrates the preferred embodiment for a system which operates compatibly with I2S. The frame-begin signal is chosen to be high ('1') for the first two words of a frame, and low for the remaining N-2 words of the frame.

Figure 5:
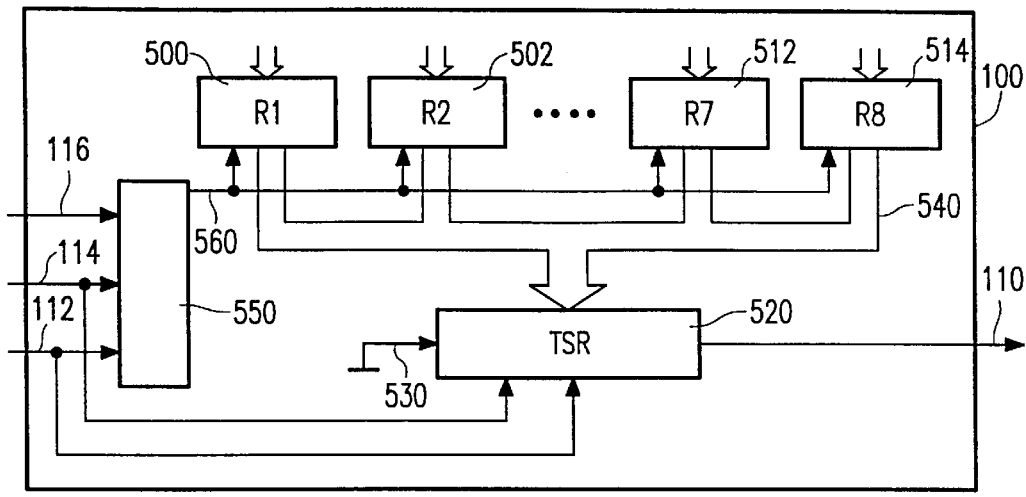
FIG. 5 shows a block diagram of a transmitter according to the invention.

FIG. 5 shows a block diagram of a transmitter 100 according to the invention, where, as an example N=8. The transmitter 100 comprises a sequence of N channel registers 500, 502, . . . , 514, where each of the channel registers corresponds to a different one of the data channels. In the example, register 500 corresponds to the first channel (chan 1) and register 514 corresponds to the eight channel (chan 8). The transmitter also comprises a shift register 520 for, in synchronisation with the clock signal 112, serially transmitting data bit(s) via the data line 110. Typically, the shift register 520 is capable of storing an entire word of the internal word length. If the internal word length is less than the maximum word length used at system level, preferably a serial data input 530 of the shift register 520 is '0', ensuring that additional least significant bits are set to '0' (assuming that the data bits are stored in the shift register 520 in such a sequence that the Most Significant Bit of a stored word is transmitted first). It will be understood that the concept of transmitting additional '0' bits, which is preferred for an audio system, can be generalised for transferring additional bits with a dummy value suitable for the application. For instance, in other systems it may be preferred to transfer additional dummy bytes with a value 'FF'.

The channel registers 500, . . . , 514 are connected to the shift register 520 via a data bus 540. It is assumed that each of the channel registers 500, . . . , 514 is capable of storing at least one data word. In such a situation, it is preferred that the content of one of the channel registers 500, . . . , 514 is parallel loaded into the shift register 520 following a trigger of the word-select signal 114. The transmitter 100 comprises register selection means 550 for selecting from which one of the channel registers 500, . . . , 514 a data word needs to be copied to the shift register 520 for transmission. Via a control signal 560 the register selection means 550 enables transferring a data word of one of the channel registers to the bus 540. The data word is loaded from the bus 540 into the shift register 520 in synchronisation with the word-select signal 114. In synchronisation with a trigger of the frame-begin signal 116, as described above, register selection means 550 selects the first channel register (in the example of FIG. 5, channel register 500) and ensures that a data word is supplied from the selected channel register to the shift register 520. In synchronisation with a regular trigger provided by the word-select signal 114, as described above, the register selection means selects the next channel register (if a channel register for channel i was selected before the trigger, the channel register for channel i+1 is selected in response to the trigger) and ensures that a data word is supplied from the selected channel register to the shift register 520. It will be appreciated that at the beginning of a frame a trigger is provided by both the word-select signal (indicating the start of a new word) as well as the frame-begin signal (indicating the start of a frame). The frame-begin signal has priority over the word-select signal, resulting in the register selection means effectively ignoring the trigger of the word-select signal when a trigger is received from the frame-begin signal. An implementation of the register selection means 520 using conventional hardware components such as flip-flops and counters is straightforward, for instance by modifying the transmitter circuit disclosed in U.S. Pat. No. 4,755,817 for I²S. Particularly for programmable general purpose components, such as a DSP, it is also straightforward to implement the selection under control of software executed by the DSP. It will be recognised that for certain implementations it may not be required to use a word-size additional shift register 520 as an additional buffer for transfer. Instead it may be possible to obtain data bits sufficiently fast from the channel registers, allowing the use of a smaller buffer or no buffer at all.

Figure 6:
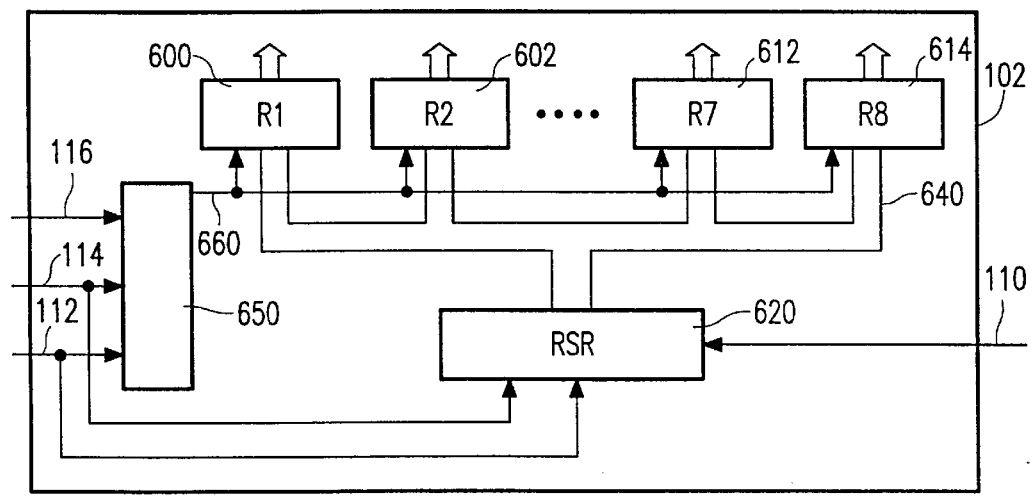
FIG. 6 shows a block diagram of a receiver according to the invention.

FIG. 6 shows a block diagram of a receiver 102 according to the invention, where, as an example N=8. The receiver 102 comprises a sequence of N channel registers 600, 602, . . . , 614, where each of the channel registers corresponds to a different one of the data channels, in a manner similar to the transmitter. The receiver 102 also comprises a storage element 620 for, in synchronisation with the clock signal 112, serially receiving data bit(s) via the data line 110. Typically, the storage element 620 is capable of storing an entire word of the internal word length. If the internal word length is less than the maximum word length used at system level, additionally received bit(s) must be ignored. If less bits are received in a word than the internal word length (the system word is smaller than the internal word), preferably the least significant bits in the storage element 620 are set to '0'. The storage element 620 is connected to the channel registers 600, . . . , 614 via a data bus 640. It is assumed that each of the channel registers 600, . . . , 614 is capable of storing at least one data word. In such a situation, it is preferred that the content of the storage element 620 is parallel loaded into one of the channel registers 600, . . . , 614 following a trigger of the word-select signal 114. The receiver 102 comprises register selection means 650 for selecting to which one of the channel registers 600, . . . , 614 a data word needs to be copied from the storage element 620. Via a control signal 660 the register selection means 650 enables transferring a data word from the bus 640 to one of the channel registers. In synchronisation with a trigger of the frame-begin signal 116, as described above, register selection means 650 selects the first channel register and ensures that a data word is loaded from the bus 640. In synchronisation with a regular trigger provided by the word-select signal 114, as described above, the register selection means 650 selects the next channel register (if a channel register for channel i was selected before the trigger, the channel register for channel i+1 is selected in response to the trigger) and ensures that a data word is loaded from the bus 640. It will be appreciated that at the beginning of a frame a trigger is provided by both the word-select signal (indicating the start of a new word) as well as the frame-begin signal (indicating the start of a frame). The frame-begin signal has priority over the word-select signal, resulting in the register selection means 650 effectively ignoring the trigger of the word-select signal when a trigger is received from the frame-begin signal. The storage element 620 may be implemented in a conventional manner, for instance using a register which is selectively addressed by a pointer bit in a shift register. A suitable circuit is also disclosed in U.S. Pat. No. 4,755,817. Also the register selection means 650 may be implemented in a conventional manner using hardware components such as flip-flops and counters. Particularly for programmable general purpose components, such as a DSP, it is also straightforward to implement the selection under control of software executed by the DSP. It will be recognised that for certain implementations it may not be required to use a word-size storage element 620 as an additional buffer for transfer. Instead it may be possible to obtain data bits sufficiently fast from the channel registers, allowing the use of a smaller buffer or no buffer at all.

Figure 7:
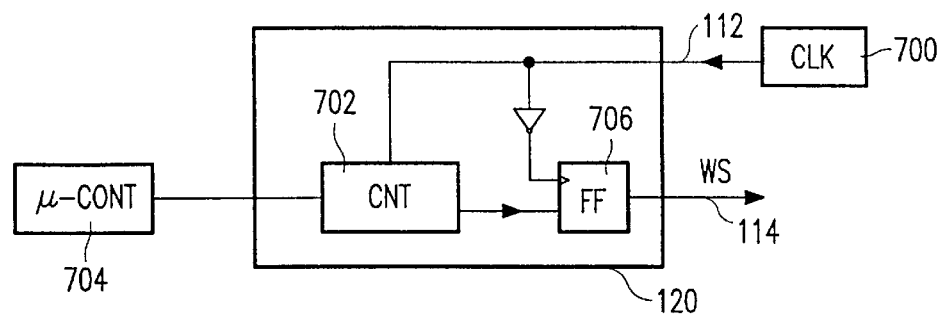
FIG. 7 shows a block diagram of a word controller according to the invention.

In a further embodiment according to the invention, the system comprises a word controller 120 for generating the word-select signal 114. In the example configuration of FIG. 1, the word controller 120 is incorporated in the control unit 106. It will be appreciated that the word controller 120 in other configurations may, for instance, be combined with the transmitter 100 or one of the receivers 102 or 104. The word controller 120 comprising an input for receiving the clock signal 112 and an output for supplying the word select signal 114. FIG. 7 shows a block diagram of an exemplary circuit implementing the word controller 120. In this example, the word controller 120 receives the clock signal 112 from a clock 700. The clock 700 may be integrated with the word controller 120 or the control unit 106 of FIG. 1 and also supply the clock signal to the other involved components of the transmitter 100 and receiver(s) 102, 104. In the exemplary circuit, the generated word-select signal 114 is a two-level signal and the word controller 120 causes a level transition of the word-select signal in response to having received a predetermined number of clock pulses since a last preceding level transition. This predetermined number corresponds to the number of data elements in a data word. The predetermined number may be permanently presented to a counter 702 or may be variably presented, for instance, by a microcontroller 704. The counter 702 counts the pulses supplied by the clock signal 112 and is reset each time the predetermined number of clock pulses has been reached. The resetting of the counter produces an output signal which is supplied to a data input of a flip-flop 706. A clock input of the flip-flop 706 receives a clock pulse and as a result generates the word-select signal 114 at an output, ensuring that the word-select signal 114 is synchronised to the clock signal 112. In the exemplary circuit of FIG. 7, an inverted clock signal 112 is received by the flip-flop 706, resulting in that the word-select signal 114 changes level in synchronisation with a trailing edge of the clock pulse, as also illustrated in FIG. 4.

Figure 8A:
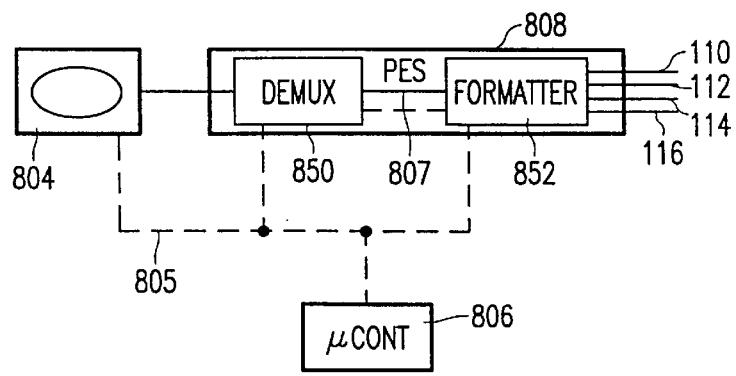
FIG. 8 shows a block diagram of an MPEG stream decoder acting as a frame controller.
Figure 8B:
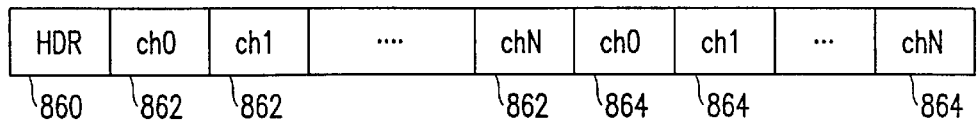

In a further embodiment according to the invention, the system comprises a frame controller 122 for generating the frame-begin signal. In the example configuration of FIG. 1, the frame controller 122 is incorporated in the control unit 106. It will be appreciated that the frame controller 122 in other configurations may, for instance, be combined with the transmitter 100 or one of the receivers 102 or 104. The frame controller 122 comprises an input for receiving the clock signal 112 and an output for supplying the frame-begin signal 116. FIG. 8a shows a block diagram of an exemplary circuit implementing the frame controller 122. Block 804 symbolises a turn-table of, for instance, a DVD player, and associated read-out and feedback mechanisms. Associated control signals are transferred via a control path 805. The player is controlled by a micro-controller 806. Block 808 represents an MPEG2 program stream decoder and audio parser that separates the bit-stream received from the player mechanism 804 into standard stereo audio and video streams and a multi-channel bit-rate reduced audio data. The MPEG2 stream decoder is broken down into a stream demultiplexer 850 which generates a Packetised Elementary Stream (PES) 807 according to the DVD specification. The PES stream 807 is passed to a formatter 852, which for the audio generates the Quad-I$^2$S (or I$^2$S for 2-channel audio) audio stream for further processing. FIG. 8b gives an overview of the PES stream 807 packet. A header 860 is followed by a data field 862 for each audio channel. The data field 862 consists of up to 16 bits. If the word-size is longer, an optional data field 864 for each audio field comprises the additional bits. The data field 862 and 864 are transferred in a fixed sequence, starting form the first channel (channel 0). The header 860 contains information such as the number of channels and the word-size. From the header information the formatter 852 reformats the data of the PES stream 807 for transmission via the system according to the invention. From this information the formatter 852 can determine the moment at which data words of the received PES packets should be transferred via the system according to the invention and control the frame-begin signal 116 accordingly, acting as the frame controller. The formatter 852 may perform the role of frame controller, for instance, by using dedicated hardware such as a sequencer or under software control of a micro-controller or DSP. Advantageously, the formatter 852 automatically selects whether the audio data should be transferred via the system of the invention in the first or second mode based in the information in the PES header 860. Alternatively, the micro-controller 806 may set the formatter 852 in the required mode.

To this end, in a further embodiment according to the invention, the frame controller 122 comprises an input for receiving, for instance from the micro-controller 704 or 806, an indication of the mode and the frame controller 122 controls the frame-begin signal accordingly.

In a further embodiment according to the invention, the frame controller 122 receives, for instance from the micro-controller 704 or 806, an indication of an actual number of data channels for which data elements need to be transferred. Based on this input, the frame controller 122 set the internal mode for generating the frame-begin signal 116. The mode is set to the second mode if the actual number corresponds to N2. The mode is set to the first mode if the number differs from N2.

In a further embodiment according to the invention, the transmitter 100 comprises means for, if the actual number of data channels for which data elements need to be transferred is less than the predetermined number, generating dummy data elements for transmission for the data channels for which no data elements are available. In an audio system it is preferred that for the not-used channel '0' bits are transferred. For other systems it may be preferred that a special bit pattern is transferred via an unused channel, indicating that no data is transferred via the channel. The dummy generation means may be combined with the register selection means 550, where the register selection means selects a dummy input channel register for the unused channels. In a software implementation; this may involve copying a zero-word into the transmit shift register 520.

Figure 9:
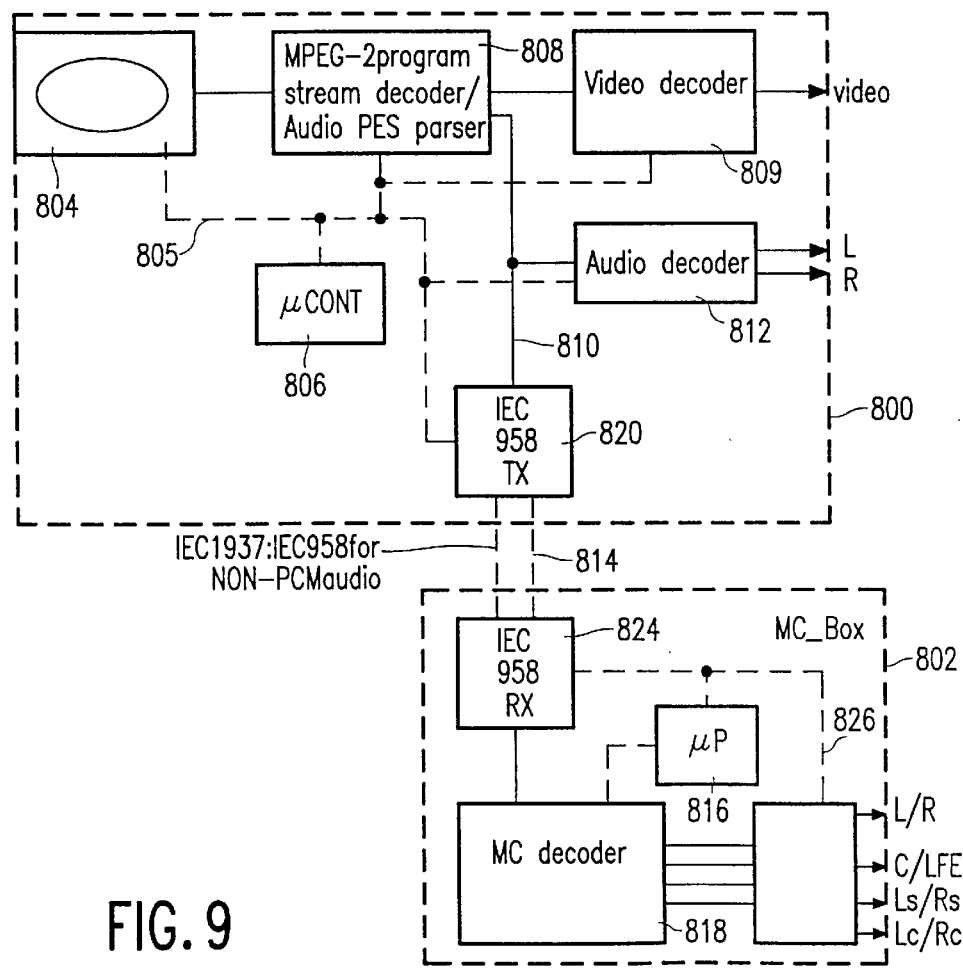
FIG. 9 illustrates an exemplary system using the transfer system of the invention.

FIG. 9 illustrates an audio/video system in which the transfer system according to the invention may advantageously be used. The audio/video system comprises a DVD player 800 and a Multi-Channel decoder 802. In the player 800, block 804 symbolises a turn-table and associated read-out and feedback mechanisms. Associated control signals are transferred via a control path 805. The system is controlled by a micro-controller 806. The playing mechanism 804 can, for a digital video disk, supply an MPEG2 encoded audio or up to eight linear-PCM audio channels. Block 808 represents an MPEG2 program stream decoder and audio parser that separates the bit-stream received from the player mechanism 804 into standard stereo audio and video streams and a multi-channel bit-rate reduced audio data. A video decoder 809 converts the video stream into a conventional video signal. The audio stream and the multi-channel bit-rate reduced audio data are transferred using the transfer system according to the invention via signal lines 810. For a relatively low-level consumer application, it is sufficient that an audio decoder 812 in the DVD player 800 generates an analogue left and right output signal. This may, for instance, be a conventional stereo signal, a prologic encoded stereo signal or a karaoke encoded stereo signal. For transferring the up to eight linear-PCM audio channels from the audio parser 808 to the audio decoder 812, the transfer system of the invention is advantageously used in the quad-$I^2S$ mode. For transferring MPEG-encoded audio from the MPEG2 program stream decoder 808 to the audio decoder 812, sufficient capacity is provided by operating the transfer system in the $I^2S$ compatible mode. The burst format described in WO patent application PCT/IB96/01267 (PHN 15603) may, advantageously, also be used for transfer via $I^2S$.

The following table summarises the operation modes of the audio decoder 812 with the corresponding inputs and outputs:

| Decoder Mode | Frame sample rate (fs) | Input | Output |
|---|---|---|---|
| MPEG decoding | 48 kHz. | $I^2S$ in burst format | stereo prologic stereo karaoke stereo |
| Linear PCM | 96 kHz. 48 kHz. | Quad $I^2S$ | down-sampled stereo stereo |

For linear PCM, the following configurations for storing the audio on the disk have been defined, where the number of channels stored on the disk defines the allowed frame sampling rate (fs) and the quantisation (word length):

| Number of channels | fs in kHz. | Quantisation |
|---|---|---|
| 1 | 48 or 96 | 16, 20, or 24 bits |
| 2 | 48 or 96 | 16, 20, or 24 bits |
| 3 | 48 | 16, 20, or 24 bits |
|   | 96 | 16, or 20 bits |
| 4 | 48 | 16, 20, or 24 bits |
|   | 96 | 16 bits |
| 5 | 48 | 16, 20, or 24 bits |
| 6 | 48 | 16, 20, or 24 bits |
| 7 | 48 | 16, 20, or 24 bits |
| 8 | 48 | 16, 20, or 24 bits |

The following table shows the allocation of the variable number of linear-PCM audio channels to the data words ($ch_0$ to $ch_7$) in a Quad I2S frame. The left column indicates the number of channels being transferred. A hyphen (-) indicates that the word is unused. Preferably an unused word is filled with dummy '0'-bits. The table shows the allocation for a frame sampling rate of 48 kHz. (For DVD) or 44.1 kHz (for CD-DA).

| # L-PCM channels | $ch_0$ | $ch_1$ | $ch_2$ | $ch_3$ | ch4 | $ch_5$ | $ch_6$ | $ch_7$ |
|---|---|---|---|---|---|---|---|---|
| 1 | 1 | — | — | — | — | — | — | — |
| 2 | 1 | 2 | — | — | — | — | — | — |
| 3 | 1 | 2 | 3 | — | — | — | — | — |
| 4 | 1 | 2 | 3 | 4 | — | — | — | — |
| 5 | 1 | 2 | 3 | 4 | 5 | — | — | — |
| 6 | 1 | 2 | 3 | 4 | 5 | 6 | — | — |
| 7 | 1 | 2 | 3 | 4 | 5 | 6 | 7 | — |
| 8 | 1 | 2 | 3 | 4 | 5 | 6 | 7 | 8 |

The following table shows the allocation of the variable number of linear-PCM audio channels to the data words ($ch_0$ to $ch_7$) in a Quad I2S frame for a frame sampling rate of 96 kHz. (for DVD). In this case, the frame sampling rate of the transfer system (Quad $I^2S$) preferably remains 48 kHz. and two data words in each frame are allocated to one audio channel. As shown in the table, data words corresponding to the same channel are evenly spread through the frame, allowing the involved components sufficient time to process a data word before the next data word of the same channel needs to be processed.

| # L-PCM channels | $ch_0$ | $ch_1$ | $ch_2$ | $ch_3$ | ch4 | $ch_5$ | $ch_6$ | $ch_7$ |
|---|---|---|---|---|---|---|---|---|
| 1 | 1 | — | — | — | 1 | — | — | — |
| 2 | 1 | 2 | — | — | 1 | 2 | — | — |
| 3 | 1 | 2 | 3 | — | 1 | 2 | 3 | — |
| 4 | 1 | 2 | 3 | 4 | 1 | 2 | 3 | 4 |

For attaining full functionality of MPEG2, an external multi-channel decoder box 802 of FIG. 9 has been provided. For such an application, the MPEG data is preferably configured according to the burst format described in WO patent application PCT/IB96/01267 (PHN 15603) and transferred from the player 800 to the MC decoder box 802 via a communication channel 814 according to the standardised IEC 958 protocol using an IEC 958 transmitter 820 and receiver 824. The channel 814 may be based on galvanic interconnection or optical fibre. Like the DVD player 800, the MC decoder box 802 has an internal control path 826 and a micro-controller 816 for controlling the operation of the decoder box 802. The MPEG encoded audio stream is supplied to a Multi Channel decoder 818 that may output up to seven audio channels: Left, Right, LFE/C, Left centre surround, Right centre surround, Left surround and Right surround. Preferably, the output channels are grouped on four $I^2S$ interfaces for, for instance, transfer to respective D/A converters and amplifiers or to a recorder.

What is claimed is:

1. A data transfer system comprising a transmitter and at least one receiver; the transmitter and receiver being connected by a data line for time-multiplexed transfer of data words of, in a first mode, up to a predetermined number N of data channels, where N is larger than two and each data word comprises at least one data element;

the transmitter comprising:
 a sequence of N channel registers, each corresponding to a different one of the data channels;
 register selection means for selecting one of the channel registers for supply of a data word for transmission; the selection comprising selecting a first one of the channel registers in synchronisation with a frame-begin signal, and selecting a next one of the channel registers in synchronisation with a regular trigger provided by a word-select signal; the frame-begin signal having priority over the word-select signal; and means for, in synchronisation with a periodic clock signal, transmitting a data word from the selected channel register via the data line;

the receiver comprising:

a sequence of N channel registers, each corresponding to a different one of the data channels;

register selection means for selecting one of the channel registers for receipt of a data word; the selection comprising selecting a first one of the channel registers in synchronisation with the frame-begin signal, and selecting a next one of the channel registers in synchronisation with a regular trigger provided by the word-select signal; the frame-begin signal having priority over the word-select signal; and means for, in synchronisation with the periodic clock signal, receiving a data word via the data line and storing the data word in the selected channel register.

2. A system as claimed in claim 1, wherein the system in a second mode supports transfer of data words for up to a N2 data channels; N2 being smaller than N; wherein the frame-begin signal is a two-level signal and wherein the system comprises a frame controller operative to control the frame-begin signal by:

in the second mode maintaining the frame-begin signal at a first level; and in the first mode maintaining the frame-begin signal at the first level for the duration of the transfer of at least N2 but less than N successive data words and at a distinct second level for the remaining duration of the transfer of N successive data words; a transition of the frame-begin signal to the first level being the trigger causing the register selection means to select the first one of the channel registers.

3. A system as claimed in claim 2, wherein N2=2; wherein the word-select signal is a two-level signal with a level transition of the word-select signal being the trigger for the register selection means to select a next one of the channel registers, and wherein the register selection means is operative to, in the second mode, select the first one of the channel registers in response to a transition of the word-select signal to a first level.

4. A system as claimed in claim 2, wherein the frame controller comprises an input for receiving an indication of the mode and wherein the frame controller is operative to control the frame-begin signal accordingly.

5. A system as claimed in claim 2, wherein the frame controller comprises an input for receiving an indication of an actual number of data channels for which data elements need to be transferred and wherein the frame controller is operative to control the frame-begin signal for the second mode if the actual number corresponds to N2 and, otherwise, to control the frame-begin signal for the first mode.

6. A system as claimed in claim 2, wherein the system comprises a word controller; the word controller comprising an input for receiving the clock signal and an output for supplying the word select signal; the word-select signal being a two-level signal and the word controller being operative to cause a level transition of the word-select signal in response to having received a predetermined number of clock pulses since a last preceding level transition; the predetermined number corresponding to the number of data elements in a data word.

7. A system as claimed in claim 6, wherein the word controller comprises an input for receiving an indication of the predetermined number of clock pulses and the word controller is operative to control the word select signal accordingly.

8. A system as claimed in any one of the preceding claims, wherein the transmitter comprises means for, if the actual number of data channels for which data elements need to be transferred is less than the predetermined number, generating dummy data elements for transmission for the data channels for which no data elements are available.

9. A system as claimed in claim 2, wherein the second mode is compatible with the $I^2S$ system.

10. A system as claimed in claim 9, wherein N=8 and in the first mode the periodic clock signal has a frequency four times higher than used for the $I^2S$ system.

11. A transmitter for time-multiplexed transfer of data words of, in a first mode, up to a predetermined number N of data channels via a data line, where N is larger than two and each data word comprises at least one data element; the transmitter comprising:

a sequence of N channel registers, each corresponding to a different one of the data channels;

register selection means for selecting one of the channel registers for supply of a data word for transmission; the selection comprising selecting a first one of the channel registers in synchronisation with a frame-begin signal, and selecting a next one of the channel registers in synchronisation with a regular trigger provided by a word-select signal; the frame-begin signal having priority over the word-select signal; and means for, in synchronisation with a periodic clock signal, transmitting a data word from the selected channel register via the data line.

12. A transmitter as claimed in claim 11, wherein the transmitter in a second mode supports transfer of data words for up to N2 data channels; N2 being smaller than N; wherein the frame-begin signal is a two-level signal and wherein the transmitter comprises a frame controller operative to control the frame-begin signal by:

in the second mode maintaining the frame-begin signal at a first level; and in the first mode maintaining the frame-begin signal at the first level for the duration of the transfer of at least N2 but less than N successive data words and at a distinct second level for the remaining duration of the transfer of N successive data words; a transition of the frame-begin signal to the first level being the trigger causing the register selection means to select the first one of the channel registers.

13. A transmitter as claimed in claim 11, wherein the transmitter in a second mode supports transfer of data words for N2=2 data channels; wherein the word-select signal is a two-level signal with a level transition of the word-select signal being the trigger for the register selection means to select a next one of the channel registers; wherein the frame-begin signal is a two-level signal; and wherein the register selection means is operative to:

in the first mode select the first one of the channel registers, in response to a transition of the frame-begin signal to a first level; and in the second mode select the first one of the channel registers, in response to a transition of the word-select signal to a first level.

14. A transmitter as claimed in claim 12, wherein the transmitter comprises an input for receiving an indication of an actual number of data channels for which data elements need to be transferred and wherein the frame controller is operative to control the frame-begin signal for the second mode if the actual number corresponds to N2 and, otherwise, to control the frame-begin signal for the first mode.

15. A transmitter as claimed in claim 12, wherein the transmitter comprises a word controller; the word controller comprising an output for supplying the word select signal; the word-select signal being a two-level signal and the word controller being operative to cause a level transition of the word-select signal in response to having received a predetermined number of clock pulses since a last preceding level transition; the predetermined number corresponding to the number of data elements in a data word.

16. A transmitter as claimed in claim 15, wherein the transmitter comprises an input for receiving an indication of the predetermined number of clock pulses and the word controller is operative to control the word select signal accordingly.

17. A transmitter as claimed in claim 11, wherein the transmitter comprises means for, if the actual number of data channels for which data elements need to be transferred is less than the predetermined number, generating dummy data elements for transmission for the data channels for which no data elements are available.

18. A receiver for receiving time-multiplexed data words of, in a first mode, up to a predetermined number N of data channels via a data line, where N is larger than two and each data word comprises at least one data element; the receiver comprising:

a sequence of N channel registers, each corresponding to a different one of the data channels;

register selection means for selecting one of the channel registers for receipt of a data word; the selection comprising selecting a first one of the channel registers in synchronisation with the frame-begin signal, and selecting a next one of the channel registers in synchronisation with a regular trigger provided by the word-select signal; the frame-begin signal having priority over the word-select signal; and means for, in synchronisation with the periodic clock signal, receiving a data word via the data line and storing the data word in the selected channel register.

19. A receiver as claimed in claim 18, wherein the receiver in a second mode supports receipt of data words for up to N2 data channels; N2 being smaller than N; wherein the frame-begin signal is a two-level signal; and wherein the receiver comprises a frame controller operative to control the frame-begin signal by:

in the second mode maintaining the frame-begin signal at a first level; and in the first mode maintaining the frame-begin signal at the first level for the duration of the transfer of at least N2 but less than N successive data words and at a distinct second level for the remaining duration of the transfer of N successive data words; a transition of the frame-begin signal to the first level being the trigger causing the register selection means to select the first one of the channel registers.

20. A receiver as claimed in claim 18, wherein the receiver in a second mode supports transfer of data words for N2=2 data channels; wherein the word-select signal is a two-level signal with a level transition of the word-select signal being the trigger for the register selection means to select a next one of the channel registers; wherein the frame-begin signal is a two-level signal; and wherein the register selection means is operative to:

in the first mode select the first one of the channel registers, in response to a transition of the frame-begin signal to a first level; and in the second mode select the first one of the channel registers, in response to a transition of the word-select signal to a first level.

21. A receiver as claimed in claim 19, wherein the frame controller comprises an input for receiving an indication of an actual number of data channels for which data elements need to be received and wherein the frame controller is operative to control the frame-begin signal for the second mode if the actual number corresponds to N2 and, otherwise, to control the frame-begin signal for the first mode.

22. A receiver as claimed in claim 19, wherein the receiver comprises a word controller; the word controller comprising an output for supplying the word select signal; the word-select signal being a two-level signal and the word controller being operative to cause a level transition of the word-select signal in response to having received a predetermined number of clock pulses since a last preceding level transition; the predetermined number corresponding to the number of data elements in a data word.

23. A receiver as claimed in claim 22, wherein the word controller comprises an input for receiving an indication of the predetermined number of clock pulses and the word controller is operative to control the word select signal accordingly.

* * * * *